United States Patent
Mezei et al.

(10) Patent No.: US 11,810,682 B2
(45) Date of Patent: Nov. 7, 2023

(54) NEUTRON ABSORBING CONCRETE WALL AND METHOD FOR PRODUCING SUCH CONCRETE WALL

(71) Applicant: MIRROTRON KFT, Budapest (HU)

(72) Inventors: Ferenc Mezei, Budapest (HU); Luca Zanini, Staffanstorp (SE)

(73) Assignee: MIRROTRON KFT, Budapest (HU)

( * ) Notice: Subject to any disclaimer, the term of this patent is extended or adjusted under 35 U.S.C. 154(b) by 584 days.

(21) Appl. No.: 17/053,898

(22) PCT Filed: May 8, 2019

(86) PCT No.: PCT/HU2019/050019
§ 371 (c)(1),
(2) Date: Nov. 9, 2020

(87) PCT Pub. No.: WO2019/215464
PCT Pub. Date: Nov. 14, 2019

(65) Prior Publication Data
US 2021/0304911 A1    Sep. 30, 2021

(30) Foreign Application Priority Data
May 9, 2018 (HU) .................................. P1800156

(51) Int. Cl.
*G21F 1/04* (2006.01)
*C04B 14/32* (2006.01)
(Continued)

(52) U.S. Cl.
CPC ............ *G21F 1/047* (2013.01); *C04B 14/323* (2013.01); *C04B 14/34* (2013.01);
(Continued)

(58) Field of Classification Search
CPC ....... G21F 1/047; C04B 14/323; C04B 14/34; C04B 20/0048; C04B 28/02;
(Continued)

(56) References Cited

U.S. PATENT DOCUMENTS 3,453,160 A    7/1969  Darling et al.
6,630,683 B2  10/2003  Vanvor
(Continued)

FOREIGN PATENT DOCUMENTS

DE    102004063185 A1    4/2006
JP         2008157801 A    7/2008
KR      20160066377 A    6/2016

OTHER PUBLICATIONS

Schmidt, Fritz A. R.: The attenuation properties of concrete for shielding of 1-15 neutrons of energy less than 15 MeV (Oak Ridge National Laboratory) Aug. 1970 Chapters II and III, especially Chapter II, Sections 6, 7; Chapter III, Sections 2, 4 (Downloaded on Aug. 16, 2019 from https://inis.iaea.org/collection/NCLCollectionStore/_Public/02/004/2004075.pdf).

*Primary Examiner* — Nicole M Ippolito
*Assistant Examiner* — Hanway Chang
(74) *Attorney, Agent, or Firm* — Olson & Cepuritis, Ltd.

(57) ABSTRACT

The object of the invention relates to a neutron absorbing concrete wall (10), which concrete wall (10) has an internal delimiting surface (11*a*), and an external delimiting surface (11*b*) on an opposite side to the internal delimiting surface (11*a*), the essence of which is that it contains a first concrete layer (13*a*) on the side of the internal delimiting surface (11*a*), and a second concrete layer (13*b*) on the side of the external delimiting surface (11*b*), which first concrete layer (13*a*) contains at least 0.05 mass % boron-10 isotope (10B), and the second concrete layer (13*b*) is formed as heavyweight concrete. The object of the invention also relates to a method for creating a neutron radiation absorbing concrete (Continued)

Figure 1:
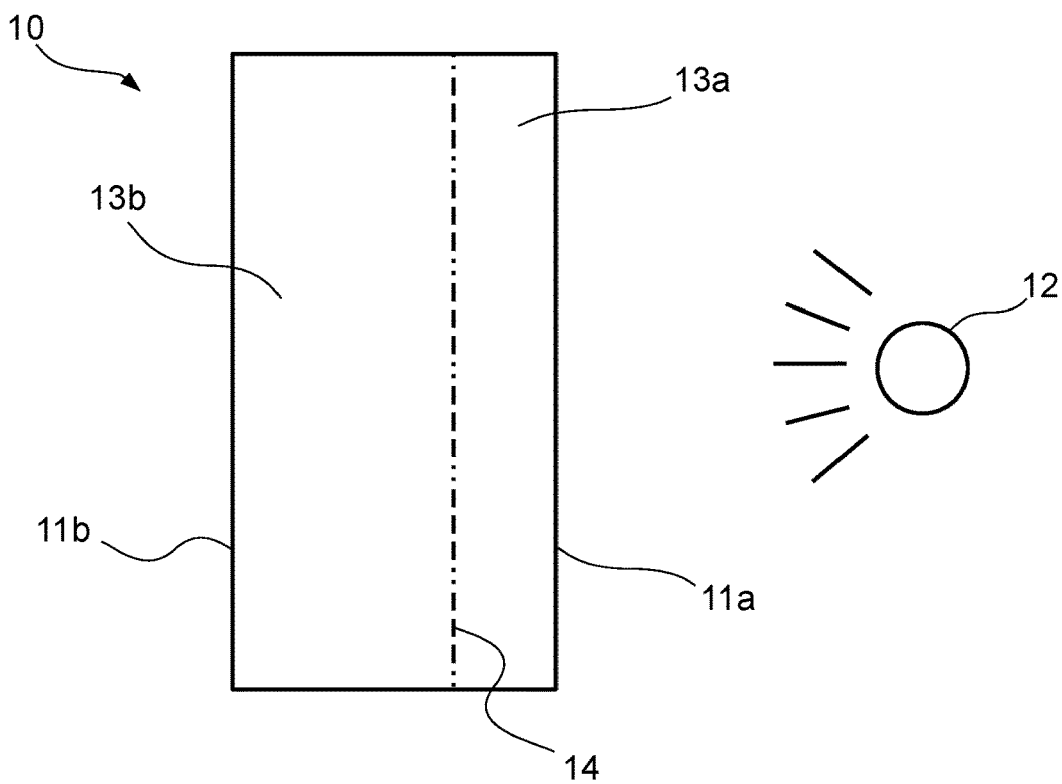

wall (10) that has an internal delimiting surface (11a), and an external delimiting surface (11b) on an opposite side to the internal delimiting surface (11a), the essence of which is a first concrete layer (13a) containing at least 0.05 mass % boron-10 isotope ($^{10}$B) is formed on the side of the internal delimiting surface (11a), and a second concrete layer (13b) created as heavyweight concrete is formed on the side of the external delimiting surface (11b). The object of the invention also relates to a neutron absorbing concrete wall (10), the essence of which is that it is formed as heavyweight concrete containing at least 0.05 mass % boron-10 isotope ($^{10}$B).

18 Claims, 3 Drawing Sheets

(51) Int. Cl.
*C04B 14/34* (2006.01)
*C04B 20/00* (2006.01)
*C04B 28/02* (2006.01)
*E04B 1/92* (2006.01)
*E04B 2/84* (2006.01)
*B28B 1/14* (2006.01)
*C04B 111/00* (2006.01)

(52) U.S. Cl.
CPC .......... *C04B 20/0048* (2013.01); *C04B 28/02* (2013.01); *E04B 1/92* (2013.01); *E04B 2/84* (2013.01); *B28B 1/14* (2013.01); *C04B 2111/00612* (2013.01); *C04B 2111/00862* (2013.01); *E04B 2001/925* (2013.01)

(58) Field of Classification Search
CPC . C04B 2111/00612; C04B 2111/00862; E04B 1/92; E04B 2/84; E04B 2001/925; B28B 1/14
See application file for complete search history.

(56) References Cited

U.S. PATENT DOCUMENTS

2002/0134951 A1 9/2002 Vanvor
2013/0051512 A1 2/2013 Hallstadius et al.

NEUTRON ABSORBING CONCRETE WALL AND METHOD FOR PRODUCING SUCH CONCRETE WALL

CROSS-REFERENCE TO RELATED APPLICATIONS

This application is a U.S. National Stage of PCT/HU2019/050019, filed May 8, 2019, which claims priority to Hungarian Application No. P1800156, filed May 9, 2018, each of which is incorporated herein by reference.

The object of the invention relates to a neutron absorbing concrete wall, which concrete wall has an internal delimiting surface, and an external delimiting surface on an opposite side to the internal delimiting surface.

The object of the invention also relates to a method for creating a neutron radiation absorbing concrete wall that has an internal delimiting surface, and an external delimiting surface on an opposite side to the internal delimiting surface.

Neutron beams have a broad range of applications in various fields of science, technology and healthcare. It is necessary to take the appropriate protection measures against the neutrons unavoidably emitted in work with neutron radiation, or during the operation of accelerators so that the level of radiation the personnel is exposed to does not reach the level that is harmful to health. A conventional form of radiation protection is represented by closed, more or less thick walled chambers around the radiation source, the walls of which only permit the neutron radiation present on one side of the walls to pass through to the other side after being intensively weakened.

As the types of radiation and their effects are many, inhibiting them is presently carried out with various types of device. In order to provide protection against neutrons of varying energy, walls have to be provided containing various elements so that the required thickness is not extreme.

In the low energy range (e.g. thermal neutrons) several chemical elements are known that absorb neutrons and are less activated in this process. Examples of such elements include boron, gadolinium or cadmium. However, these substances emit other ionising radiation (e.g. γ-radiation) immediately following the absorption of neutrons, which also has to be weakened for protection. In the case of medium-energy neutrons substances containing hydrogen are very effective, which slow down the neutrons and absorb them to a lower degree. An example of such a substance is water.

High-energy neutrons are absorbed with high-density and high atomic weight substances. Due to its price and workability iron is used most often for this purpose, less often lead. On their own, these materials are only used when the radiation source is compact, and so a small volume needs to be isolated. In practice, however, as a result of the extensive size of the radiation source, it is customary to isolate it with a concrete structure. Radiation shielding made from concrete customarily used in the construction industry in many cases can only be achieved with exaggerated structural dimensions. Where the amount of space available is limited or valuable and the customary concrete protection would require too much space, high-density concrete with a special composition, so-called heavyweight concrete, is also used which, apart from the traditional components of concrete, contains iron (e.g. iron ore aggregate, iron ore powder, compounds containing iron, or steel shot, etc.), as well as other heavy elements, e.g. barium, lead or copper. The density of heavyweight concrete is usually between 3200 and 5000 kg/m3. The concrete also contributes to the blocking of the neutrons due to its water content.

The problem with radiation shields made from concrete is that the heavy element components (iron, for example), especially those located closer to the radiation source, become activated due to the effect of the high intensity neutron radiation, especially the low energy neutrons, as a result of which they emit secondary γ-radiation for an extended period. The radiation of the concrete wall makes any repairs or maintenance to be performed in the space surrounded by it difficult or even impossible. In addition, the activation of certain activated elements dissipates only after a long amount of time (even years), for example, in the case of iron the dominating half-life is 8 months (as well as shorter duration activated components).

A solution is disclosed in American patent number U.S. Pat. No. 3,453,160 that partially overcomes the above problem. The internal surface of the concrete wall surrounding the radiation source is covered with plasterboard sheets impregnated with boric acid, which reduce the activation of the concrete underneath them. The disadvantage of the solution is that plasterboard sheets do not contribute to the structural stability of the structure, in other words they do not fulfil a load-bearing function, while they take up useful space from the enclosed interior. In addition, it is difficult or even impossible to cover complex surface (e.g. curves, corners) in this manner. Another disadvantage of the solution is that the elements for securing the plasterboard sheets to the concrete (bolts, anchors) may weaken the structure of the concrete, and start the formation of cracks in it that may represent a safety risk.

German patent document number DE102004063185 discloses a radiation shielding wall structure. In the case of the solution presented the basis of the radiation shielding consists of blocks made of gypsum that are placed on one another in such a way that they may be subsequently dismantled. Optionally, the gypsum blocks contain further layers in a sandwich structure. Paragraph 26 of the specification of the document mentions that a neutron absorbing material, such as boron, can be mixed with the gypsum, although nothing at all is stated about the concentration of the additive. A disadvantage of the presented solution is that complex surfaces (e.g. curves, corners) cannot be constructed from the gypsum blocks at all. A further disadvantage of the disclosed solution is that the loadbearing characteristics of gypsum are well below those of concrete; therefore a wall made from the described technology will be very thick.

American patent application number US2013051512 presents neutron absorbing components (such as rods used in reactors), however, it does not deal with radiation shielding walls.

Korean patent application number KR20160066377 presents a two-layer radiation shielding concrete wall, on the side of which facing the radiation source a concrete layer containing a polymer, and on the other side a concrete layer containing boron is provided. The two concrete layers are secured to each other forming a sandwich-like concrete wall. An important difference is that here the concrete layer containing boron is not on the side facing the radiation source, also it is important to highlight that the disclosed solution does not contain any heavyweight concrete layer. The document mentioned also fails to display the recognition that the heavy element components in the heavyweight concrete become activated due to the effect of the high intensity neutron radiation.

We recognised that at present a neutron shielding wall that equally effectively absorbs low, medium and high energy neutrons and has suitable load-bearing characteristics and low construction costs does not exist.

It was recognised that if 0.05 mass % boron-10 is evenly added to heavyweight concrete a concrete wall can be created that is capable of absorbing a wide energy spectrum of neutron radiation.

Furthermore, the invention is based on the recognition that by building a heavyweight concrete layer effective at blocking fast neutrons and a concrete layer containing at least 0.05 mass % boron-10 (10B) together as one, particularly preferably forming them as a single block, a high load-bearing radiation shielding wall may be created that equally effectively capable of absorbing low, medium and high energy neutrons. As the boron-10 isotope does not in practice become activated while absorbing neutrons, and as the boron-10 isotope absorbs especially the low energy neutrons with a greater effect cross-section, only a smaller proportion of the neutrons penetrating the concrete wall are absorbed by the iron, which means that it is less activated during the absorption process.

It was also recognised that the use of a concrete layer containing the boron-10 isotope can effectively reduce not only the activation of the heavyweight concrete but also the propagation of γ-radiation generated by the activation towards the surrounded internal space.

It was also recognised that the heavy elements (such as iron) and the boron-10 isotope mixed into the heavyweight concrete and responsible for absorbing the neutron radiation reduce the bonding strength of the cement, which is disadvantageous from the point of view of structural stability. It was recognised that the above disadvantageous effect may be overcome, or at least reduced, if the boron-10 isotope is present in the first concrete layer in uneven concentration, but it is at a maximum at the internal surface facing the radiation source, and minimal, or optionally zero, on the side facing the heavyweight concrete.

It was also recognised that the concentration gradient of the boron-10 isotope mentioned above does not only improve the structural characteristics of the concrete wall, but through this the neutron absorbing ability of the concrete wall may be increased, and the activation of the heavyweight concrete can also be more effectively reduced. In this way less neutron absorbing material (e.g. iron, steel shot, boron-10 isotope) needs to be added overall to achieve the same neutron absorbing effect.

The objective of the invention is to provide a device and method that is free of the disadvantages according to the state of the art. The objective is especially to provide a solution with which all components of wide energy distribution neutron radiation can be effectively blocked that can be simply produced at a low cost and with large structural strength.

The objects of the invention are achieved with a concrete wall according to claims 1 and 15, and a method according to claim 9.

The concrete wall and the method according to the invention are suitable for multiple uses in connection with low output neutron sources and medium output neutron sources for research purposes.

According to a further aspect of the invention, it is aimed at providing a method with which a concrete wall with the above characteristics, with an internal delimiting surface and an external delimiting surface on the opposite side to the internal surface can be effectively produced at low cost.

The task set is solved by providing heavyweight concrete containing at least 0.05 mass % boron-10 isotope.

The task set is solved by that in the case of the solution according to the invention a first concrete layer containing at least 0.05 mass % boron-10 isotope is provided on the side of the internal delimiting surface, and a second concrete layer created as heavyweight concrete is provided on the side of the external delimiting surface.

According to a particularly preferred embodiment liquid phase heavyweight concrete is filled into the lower part of a casting mould for casting concrete, then liquid phase concrete containing at least 0.05 mass % boron-10 isotope is poured into the casting mould onto the top of the liquid phase heavyweight concrete. In the case of another preferred embodiment liquid phase concrete containing at least 0.05 mass % boron-10 isotope is poured into the lower part of the casting mould, then liquid phase heavyweight concrete is poured onto the top of the liquid phase concrete containing at least 0.05 mass % boron-10 isotope. In the above ways, after the concrete has bonded a second concrete layer is formed from the liquid phase heavyweight concrete and a first concrete layer is formed from the liquid phase concrete containing at least 0.05 mass % boron-10 isotope. Through this a concrete wall may be created from a single block, the structural strength of which is high and its neutron absorbing ability exceeds that of the solutions according to the state of the art and which is also less prone to activation.

In the case of another preferred embodiment the liquid phase concrete containing at least 0.05 mass % boron-10 isotope, or the liquid phase heavyweight concrete is only poured onto the top of the liquid phase heavyweight concrete or onto the top of the liquid phase concrete containing at least 0.05 mass % boron-10 isotope after it has partially bonded.

Further preferred embodiments of the invention are defined in the dependent claims.

Figure 2:
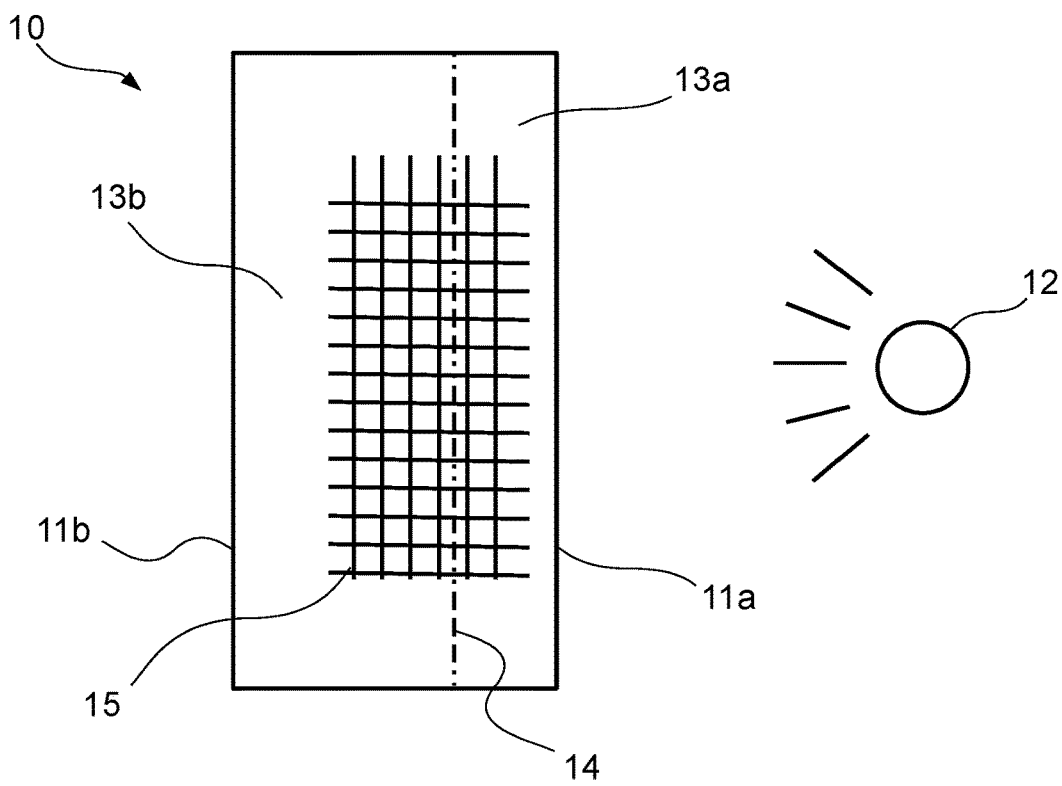
Figure 3:
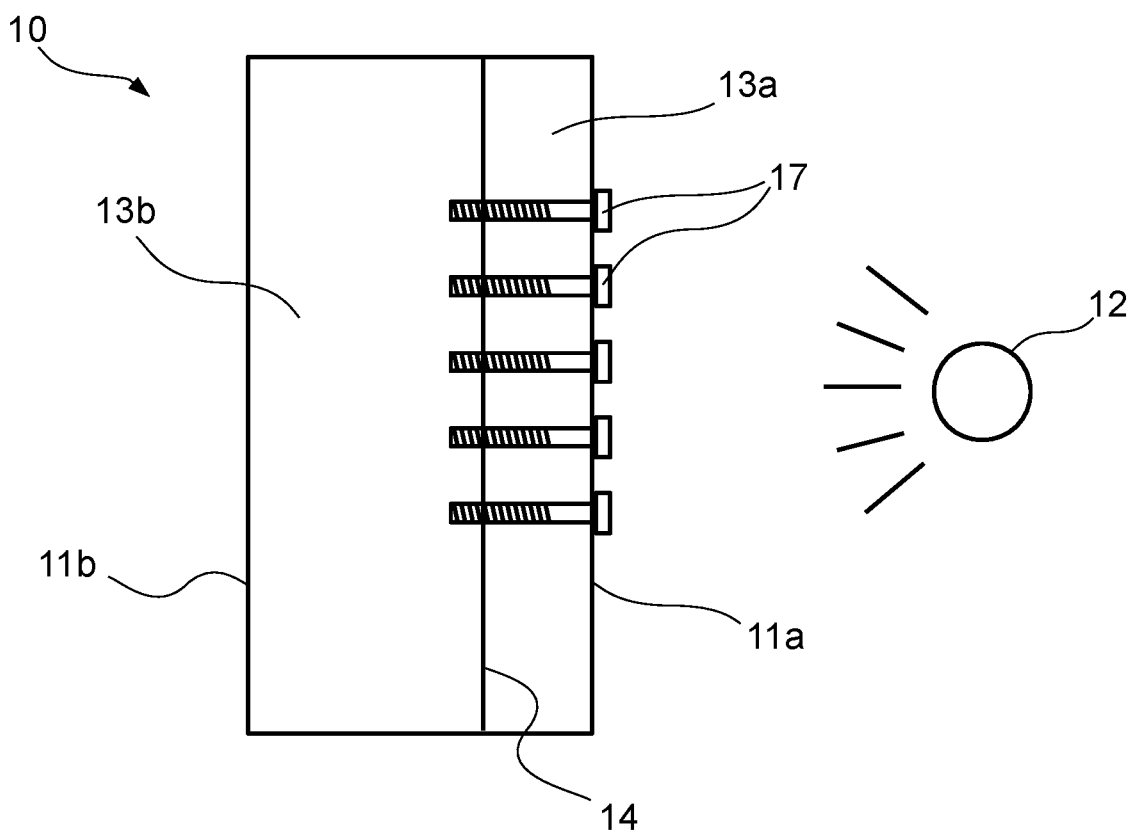
Figure 4A:
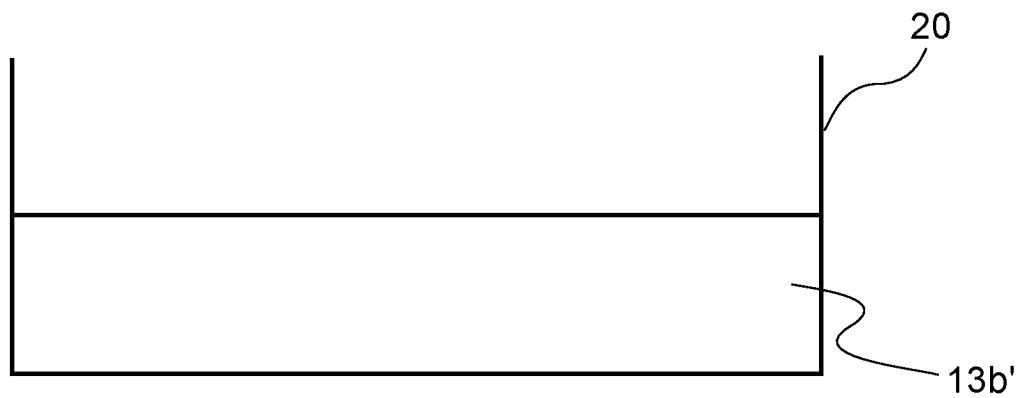
Figure 4B:
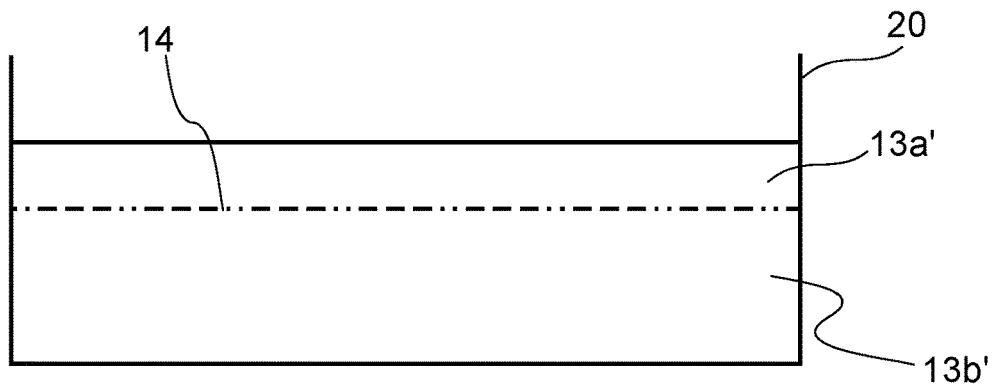
Figure 5A:
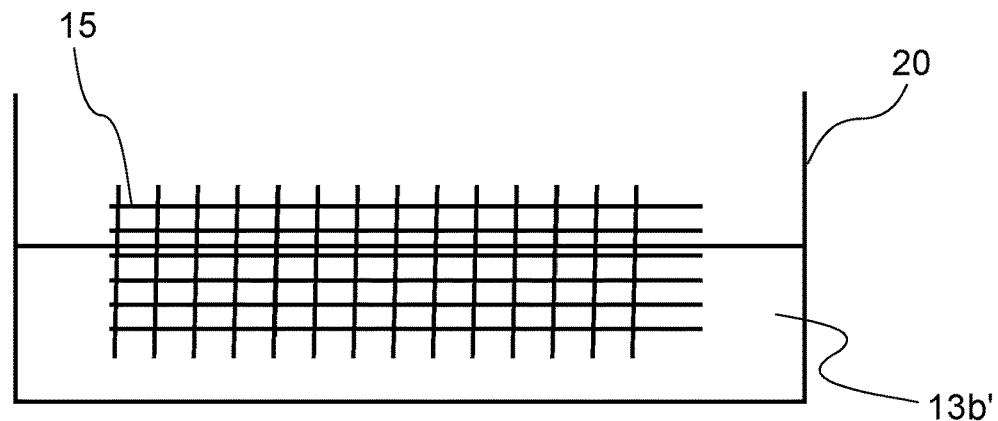
Figure 5B:
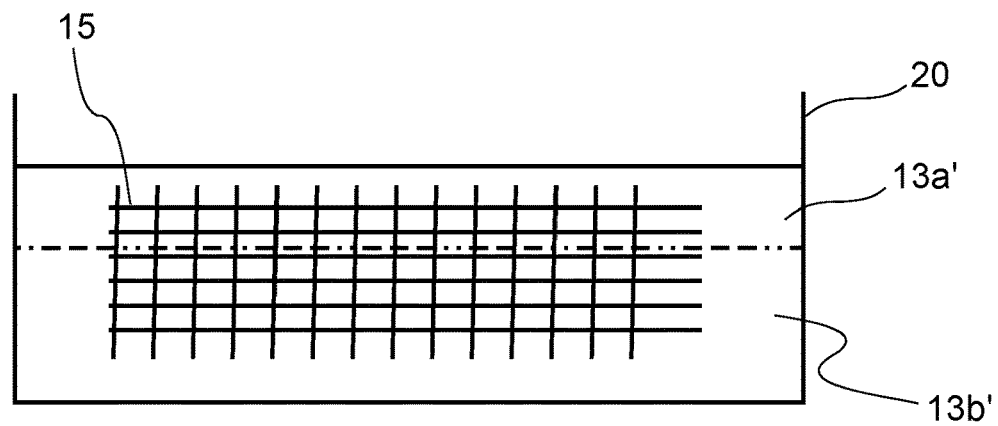

Further details of the invention will be explained by way of exemplary embodiments with reference to figures, wherein:

FIG. 1 shows a schematic side cross-sectional view of a first exemplary embodiment of a concrete wall according to the invention, FIG. 2 shows a schematic side cross-sectional view of a second exemplary embodiment of a concrete wall according to the invention, FIG. 3 shows a schematic side cross-sectional view of a third exemplary embodiment of a concrete wall according to the invention, FIG. 4a shows a schematic view presenting a state of the production of the concrete wall shown in FIG. 1, FIG. 4b shows a schematic view of a next state of the production of the concrete wall shown in FIG. 1, FIG. 5a shows a schematic view of a state of the production of the concrete wall shown in FIG. 2, FIG. 5b shows a schematic view of a next state of the production of the concrete wall shown in FIG. 2.

FIG. 1 shows a schematic side cross-section view of a first exemplary embodiment of a concrete wall 10 according to the invention. The concrete wall is for weakening or absorbing the particle radiation, especially the neutron radiation unavoidably emitted during the operation of the radiation source 12 (e.g. particle accelerator, such as proton accelerator, or neutron source). The concrete wall 10 delimits a closed internal volume (radiation volume) containing the radiation source 12 emitting the neutron radiation. The concrete wall 10 has an internal delimiting surface 11a facing the radiation source 12, and an external delimiting surface 11b on the side, facing the outside world, opposite to the internal delimiting surface 11a. The shape of the surfaces 11a, 11b may be planar, curved, arched, undulating, etc., according to the volume to be delimited and the type of radiation source 12. It should be noted that, optionally, an embodiment is conceivable in the case of which the radiation volume is enclosed with a single, continuous, for example, dome shaped concrete wall 10, but an embodiment may be conceived in the case of which the closed internal volume is created by securing several concrete wall 10 elements (e.g. with a rectangular surface 11a) to each other, similarly to the internal space of a room.

The concrete wall 10 contains a first concrete layer 13a on the side of the internal delimiting surface 11a, and a second concrete layer 13b on the side of the external delimiting surface 11b. In the case of the preferred embodiment shown in FIG. 1, the concrete wall 10 is formed as a single block, in other words as a single jointly cast block including the first and second concrete layers 13a, 13b. In this case the concrete layers 13a, 13b are secured to each other by the hydraulic bonding occurring with the solidification of the cement in them, the concrete layers 13a, 13b are not physically separated from each other. The imaginary layer border 14 separating the concrete layers 13a, 13b has been included for illustration purposes.

In the case of the concrete wall 10 according to the invention, the first concrete layer 13a contains at least 0.05 mass % boron-10 isotope with respect to the concrete forming the concrete layer 13a, and the second concrete layer 13b is formed as heavyweight concrete. It should be noted that the characteristic isotope composition of elemental boron (expressed in mole fraction) is 0.199(7) boron-10 isotope and 0.801(7) boron-11 isotope, as is known to a person skilled in the art, therefore boron-10 isotope is present both in the elemental boron and the boron compounds as well. In a preferred embodiment the boron-10 isotope is present in the first concrete layer 13a in the form of a boron compound, preferably boron carbide ($B_4C$). Boron carbide is used widely in industry for other purposes (such as an abrasive). As a consequence of the physical properties of boron carbide, it is suitable for replacing at least some of the sand used during concrete production, in other words it may be used to produce a high boron content concrete. Embodiments are also conceivable in the case of which the concentration distribution of the boron-10 isotope in the first concrete layer 13a is not homogenous. As the neutron radiation arrives at the surface 11a, and the slow neutrons do not penetrate deeply into the concrete, in the case of a possible embodiment the concentration of the boron-10 isotope is greater closer to the surface 11a, and the concentration of the boron-10 isotope decreases with distance from the surface 11a towards the surface 11b. The concentration may change continuously, for example between a maximum mass % value and 0 mass %, or even in steps. In the case of a preferred embodiment, the thickness of the first concrete layer 13a is approximately 5 cm.

In the case of a possible exemplary embodiment the concrete layer 13a contains 71.621 mass % sand and gravel, 0.329 mass % boron carbide, 18.7 mass % Portland cement and 9.35 mass % water. Naturally, other concrete compositions are conceivable, as is known to a person skilled in the art.

The second concrete layer 13b is formed as heavyweight concrete. In the context of the present invention, heavyweight concrete is understood to mean a concrete known to a person skilled in the art containing iron (e.g. crushed iron ore, iron ore powder, compound containing iron, or steel shot, etc.), and other heavy elements, such as barium, lead or copper. In the case of a possible exemplary embodiment, the concrete layer 13b contains 42 mass % hematite, 44.5 mass % steel shot, 8 mass % Portland cement, 5.3 mass % water and 0.2 mass % retarder. It should be noted that, optionally, naturally other heavyweight concrete compositions are conceivable, as is obvious for a person skilled in the art. The thickness of the concrete layer 13b is preferably between 5 cm and 2 m depending on the radiation source 12 and the intensity of the neutron radiation.

In the case of a possible embodiment the first and/or second concrete layer 13a, 13b contain reinforcing mesh 15, and the first and second concrete layers 13a, 13b are fixed to each other with the reinforcing mesh 15, as it can be seen in FIG. 2. In this case a part of the reinforcing mesh 15 is located in the concrete layer 13a, and another part of it is located in the concrete layer 13b. The reinforcing mesh 15 also provides further structural stability to the concrete layers 13a, 13b by increasing tensile strength.

In the case of another possible embodiment, the first and second concrete layers 13a, 13b are formed as separate layers fixed to one another. The fixing of the concrete layers 13a, 13b to each other may take place with known fixing elements, such as with bolts 17, as is shown in FIG. 3. The concrete layers 13a, 13b may also optionally contain reinforcing meshes 15.

The object of the invention also relates to a concrete wall 10, which contains heavyweight concrete containing at least 0.05 mass % boron-10 isotope (10B). The concrete wall 10 may also contain additional layers (e.g. a lightweight concrete layer), but preferably the concrete wall 10 contains a single concrete layer formed as heavyweight concrete containing at least 0.05 mass % boron-10 isotope. In the case of a possible embodiment, the distribution of the boron-10 isotope in the heavyweight concrete is even. In the case of a preferred embodiment the distribution of the boron-10 isotope in the heavyweight concrete is such that it is present in a concentration that increases towards the side of the heavyweight concrete facing the radiation source 12, in other words the concentration of the boron-10 isotope is at a maximum at the side of the heavyweight concrete facing the radiation source 12, and at a minimum at the side opposite it, optionally 0 mass %. It should be noted that in the case of this embodiment also, the concrete wall 10 may also contain reinforcing mesh 15 in order to increase structural stability.

The object of the invention also relates to a method for the production of a concrete wall 10 for absorbing neutron radiation, which has an internal delimiting surface 11a, and an external delimiting surface 11b on an opposite side to the internal delimiting surface 11a. During the method according to the invention a first concrete layer 13a containing at least 0.05 mass % boron-10 isotope is formed on the side of the internal delimiting surface 11a, and a second concrete layer 13b formed as heavyweight concrete is created on the side of the external delimiting surface 11b.

In the case of a particularly preferred embodiment of the method, a concrete wall 10 containing the concrete layers 13a, 13b as a single concrete block is created as follows. Liquid phase heavyweight concrete 13b' is filled into the lower part of the concrete casting mould 20, as it may be seen in FIG. 4a, for example. The casting mould 20 is selected in accordance with the concrete wall 10 to be built; in this way various surfaces (e.g. planar, curved, arched, bent, etc.) can be created. Therefore the casting mould 20 may be, for example, the opened top casting mould illustrated in FIGS. 4a to 5b, but, optionally, it may also be a closed casting mould 20 enclosed from all sides (not illustrated in the figures), as is known to a person skilled in the art. The advantage of the closed casting mould 20 is that it may use to produce concrete layers 13*a*, 13*b* of practically any desired shape of surface (arched, curved, etc.).

In the second step of the method, before the heavyweight concrete 13*b*' starts to bond, liquid phase concrete 13*a*' containing at least 0.05 mass % boron-10 isotope is poured into the casting mould 20 (see FIG. 4*b*). In this way the liquid phase concrete 13*a*' and heavyweight concrete 13*b*' bond practically simultaneously as a single concrete block, with cement bonding (hydraulic bonding) being created between the concrete layers 13*a*, 13*b*. After bonding, the second concrete layer 13*b* is formed from the liquid phase heavyweight concrete 13*b*', and the first concrete layer 13*a* is formed from the liquid phase concrete 13*a*' containing at least 0.05 mass % boron-10 isotope. It should be noted that an embodiment is also conceivable (not illustrated in the figures) in the case of which first the liquid phase concrete 13*a*' containing at least 0.05 mass % boron-10 isotope is filled into the lower part of the casting mould 20, then liquid phase heavyweight concrete 13*b*' is poured onto the top of the liquid phase concrete 13*a*' containing at least 0.05 mass % boron-10 isotope. As the concrete 13*a*' and the heavyweight concrete 13*b*' come into contact with each other in the liquid phase, they may penetrate into each other to a certain extent during bonding, therefor the layer border 14 will not be well defined in a given case. In practice, however, this does not cause any problem.

In the case of another preferred embodiment of the method according to the invention, the mixing of the layers is reduced by only pouring the liquid phase concrete 13*a*' containing at least 0.05 mass % boron-10 isotope or the liquid phase heavyweight concrete 13*b*' after the liquid phase heavyweight concrete 13*b*' or the liquid phase concrete 13*a*' containing at least 0.05 mass % boron-10 isotope filled into the lower part of the casting mould 20 has partially bonded.

In the case of another preferred embodiment a reinforcing mesh 15 is placed in the liquid phase heavyweight concrete 13*b*' or the liquid phase concrete 13*a*' containing at least 0.05 mass % boron-10 isotope filled into the casting mould 20, which reinforcing mesh 15 passes through the surface of the liquid phase heavyweight concrete 13*b*' or the liquid phase concrete 13*a*' and which remains partially uncovered, as is shown in FIG. 5*a*, for example. The reinforcing mesh 15 may be installed before, during or after the heavyweight concrete 13*b*' or the concrete 13*a*' is filled into the casting mould 20, up until it bonds. After the liquid phase heavyweight concrete 13*b*' or the liquid phase concrete 13*a*' containing at least 0.05 mass % boron-10 isotope completely or partially bonds, liquid phase heavyweight concrete 13*b*' or liquid phase concrete 13*a*' containing at least 0.05 mass % boron-10 isotope is poured onto the surface determining the layer boundary 14, onto the partially uncovered reinforcing mesh 15 (see FIG. 5*b*). In the case of this embodiment, the bonding between the concrete layers 13*a*, 13*b* is not only provided by the cement bond, but also by the reinforcing mesh 15. In this case the layer poured first may significantly solidify before the second layer is poured.

In the case of another preferred embodiment of the method according to the invention the first and second concrete layers are created separately (e.g. in separate casting moulds 20 or in the same casting mould 20 at different times), then the first and second concrete layers 13*a*, 13*b* are fixed to each other using fixing devices known to a person skilled in the art, such as bolts 17 (see FIG. 3). In this case care has to be taken that the surfaces of the concrete layers 13*a*, 13*b* facing the layer boundary 14 fit to each other. This may be solved using appropriately selected casting moulds 20. It should be noted that the separately poured concrete layers 13*a*, 13*b* may also optionally contain reinforcing mesh 15 in order to increase structural stability.

Various modifications to the above disclosed embodiments will be apparent to a person skilled in the art without departing from the scope of protection determined by the attached claims.

The invention claimed is:

1. Neutron absorbing concrete wall (10), having an internal delimiting surface (11*a*), and an external delimiting surface (11*b*) on an opposite side to the internal delimiting surface (11*a*), characterised by a first concrete layer (13*a*) on the side of the internal delimiting surface (11*a*), and a second concrete layer (13*b*) on the side of the external delimiting surface (11*b*), wherein the first concrete layer (13*a*) contains at least 0.05 mass % boron-10 isotope ($^{10}$B), and the second concrete layer (13*b*) is heavyweight concrete.

2. Concrete wall (10) according to claim 1, characterised by that in the first concrete layer (13*a*), boron-10 isotope is contained in boron carbide.

3. Concrete wall (10) according to claim 1, characterised by that in the first concrete layer (13*a*) the boron-10 isotope is present in a concentration that increases towards the internal surface (11*a*).

4. Concrete wall (10) according to claim 1, characterised by that the thickness of the first concrete layer (13*a*) is a maximum of 5 cm.

5. Concrete wall (10) according to claim 1, characterised by that the second concrete layer (13*b*) contains a member of the group consisting of iron, lead, copper, barium, and combinations thereof.

6. Concrete wall (10) according to claim 1, characterised by that the first and second concrete layers (13*a*, 13*b*) are a single cast block.

7. Concrete wall (10) according to claim 1, characterised by that the first and second concrete layers (13*a*, 13*b*) are separate layers secured to each other.

8. Concrete wall (10) according to claim 1, characterised by that at least one of the concrete layers (13*a*, 13*b*) contains a reinforcing mesh (15), and the concrete layers (13*a*, 13*b*) are secured to each other with the reinforcing mesh (15).

9. Method for creating a neutron radiation absorbing concrete wall (10) that has an internal delimiting surface (11*a*), and an external delimiting surface (11*b*) on an opposite side to the internal delimiting surface (11*a*), characterised by forming a first concrete layer (13*a*) as concrete containing at least 0.05 mass % boron-10 isotope ($^{10}$B) on the side of the internal delimiting surface (11*a*), and forming a second concrete layer (13*b*) as heavyweight concrete on the side of the external delimiting surface (11*b*).

10. Method according to claim 9, characterised by
pouring liquid phase heavyweight concrete (13*b*') into a lower part of a casting mould (20), then pouring liquid phase concrete (13*a*') containing at least 0.05 mass % boron-10 isotope ($^{10}$B) into the casting mould (20) on top of liquid phase heavyweight concrete (13*b*').

11. Method according to claim 10, characterised by pouring the liquid phase concrete (13*a*') containing at least 0.05 mass % boron-10 isotope ($^{10}$B) on top of the liquid phase heavyweight concrete (13*b*') only after the liquid phase heavyweight concrete has partially bonded.

12. Method according to claim 10, characterised by
placing a reinforcing mesh (15) in the liquid phase heavyweight concrete (13*b*') filled into the casting mould (20), which reinforcing mesh (15) passes through the surface of the liquid phase heavyweight concrete (13b') and remains partially uncovered, and after at least partial bonding of the liquid phase heavyweight concrete (13b') pouring on the partially uncovered reinforcing mesh (15) liquid phase concrete (13a') containing at least 0.05 mass % boron-10 isotope ($^{10}$B).

13. Method according to claim 9, characterised by creating the first and second concrete layers (13a, 13b) separately, then securing the first and second concrete layers (13a, 13b) to each other.

14. Method according to claim 9, characterised by providing a reinforcing mesh (15) in at least one of the concrete layers (13a, 13b).

15. Method according to claim 9, characterized by pouring liquid phase concrete (13a') containing at least 0.05 mass % boron-10 isotope ($^{10}$B) into a lower part of the casting mould (20), then pouring liquid phase heavyweight concrete (13b') on top of liquid phase concrete (13a') containing at least 0.05 mass % boron-10 isotope ($^{10}$B); creating after bonding a second concrete layer (13b) from the liquid state heavyweight concrete (13b') and a first concrete layer (13a) from liquid phase concrete (13a') containing at least 0.05 mass % boron-10 isotope ($^{10}$B).

16. Method according to claim 15, characterized by pouring liquid phase heavyweight concrete (13b') on top of the liquid phase concrete (13a') containing at least 0.05 mass % boron-10 isotope ($^{10}$B) only after the liquid phase concrete has partially bonded.

17. Method according to claim 15, characterized by placing a reinforcing mesh (15) in the liquid phase concrete (13a') containing at least 0.05 mass % boron-10 isotope ($^{10}$B) filled into the casting mould (20) which reinforcing mesh passes through the surface of the liquid phase concrete (13a') and remains partially uncovered, and after at least partial bonding of the liquid phase concrete (13a') containing at least 0.05 mass % boron-10 isotope ($^{10}$B) pouring on the partially uncovered reinforcing mesh (15) liquid phase heavyweight concrete (13b').

18. Neutron absorbing concrete wall (10), characterised by heavyweight concrete containing at least 0.05 mass % boron-10 isotope ($^{10}$B).

* * * * *